US012549921B2

(12) United States Patent
Armstrong

(10) Patent No.: US 12,549,921 B2
(45) Date of Patent: Feb. 10, 2026

(54) METHODS AND SYSTEMS FOR SIMULATING PERCEPTION OF A SOUND SOURCE

(71) Applicant: Sony Interactive Entertainment Europe Limited, London (GB)

(72) Inventor: Calum Armstrong, London (GB)

(73) Assignee: Sony Interactive Entertainment Europe Limited, London (GB)

( * ) Notice: Subject to any disclaimer, the term of this patent is extended or adjusted under 35 U.S.C. 154(b) by 214 days.

(21) Appl. No.: 18/224,665

(22) Filed: Jul. 21, 2023

(65) Prior Publication Data

US 2024/0031767 A1 Jan. 25, 2024

(30) Foreign Application Priority Data

Jul. 22, 2022 (GB) ..................................... 2210778

(51) Int. Cl.
*H04S 7/00* (2006.01)

(52) U.S. Cl.
CPC .......... *H04S 7/307* (2013.01); *H04S 2420/01* (2013.01)

(58) Field of Classification Search
CPC ............................ H04S 2420/01; H04S 7/307
See application file for complete search history.

(56) References Cited

U.S. PATENT DOCUMENTS 8,428,269 B1 4/2013 Brungart et al.
2013/0202117 A1 8/2013 Brungart et al.
2014/0334626 A1* 11/2014 Lee .......................... H04S 7/307 381/17
2016/0227338 A1 8/2016 Oh et al.
2017/0272882 A1* 9/2017 Oh .......................... H04S 7/302
2018/0242094 A1 8/2018 Baek et al.
2018/0249279 A1* 8/2018 Karapetyan ............. H04S 7/303
2021/0368285 A1 11/2021 Iida

FOREIGN PATENT DOCUMENTS

CN 109637550 A 4/2019
JP 2021022843 A 2/2021
WO 2017/063688 A1 4/2017

OTHER PUBLICATIONS

Extended European Search Report including Written Opinion for Application No. 23187072.6 dated Dec. 13, 2023, pp. 1-8.
Tan, C., et al., "User-defined spectral manipulation of HRTF for improved localisation in 3D sound systems", Electronics Letters, Dec. 10, 1998, vol. 34 No. 25, pp. 2387-2389, XP006010686.

(Continued)

*Primary Examiner* — James K Mooney
(74) *Attorney, Agent, or Firm* — Fish & Richardson P.C.

(57) ABSTRACT

An audio personalisation method for simulating perception of a vertical displacement of a sound source, the method comprising the steps of: obtaining an input head related transfer function, HRTF, associated with a user; determining an intended vertical displacement for the sound source; selecting at least one frequency region in the input HRTF; and adjusting the amplitude of the selected frequency region(s) to simulate the intended vertical displacement for the sound source. This provides improvements to the generation and/or manipulation of HRTFs to allow adjustment of the perceived location of a sound source.

20 Claims, 9 Drawing Sheets

(56) References Cited

OTHER PUBLICATIONS

Iida, K., et al. "Toolkit for individualization of head-related transfer functions using parametric notch-peak model", Applied Acoustics, Jan. 14, 2022, vol. 189, Elsevier, p. 1-8, XP093107770.
Miccini, R., et al., "A hybrid approach to structural modeling on indiviualized HRTFs", 2021 IEEE Conference on Virtual Reality and 3D User Interfaces Abstracts and Workshops (VRW), IEEE, Mar. 27, 2021, pp. 80-85, XP033911271.
Silzle, A., "Selection and tuning of HRTFS", Audio Engineering Society Convention Paper 5595, AES Convention, May 2002, pp. 1-14, XP055929400.
Combined Search and Examination Report for Application No. GB2210778.3 dated Jan. 30, 2023. 7 pgs.
Examination Report in United Kingdom Appln. No. GB2210778.3, mailed on Mar. 17, 2025, 4 pages.

* cited by examiner

METHODS AND SYSTEMS FOR SIMULATING PERCEPTION OF A SOUND SOURCE

CROSS-REFERENCE TO RELATED APPLICATIONS

The present application claims priority from United Kingdom Patent Application No. 2210778.3, filed Jul. 22, 2022, the disclosure of which is hereby incorporated herein by reference.

FIELD OF THE INVENTION

The following disclosure relates to methods and systems for simulating perception of a sound source, in particular perception of a vertical displacement of a sound source, using head-related transfer functions (HRTFs). HRTFs are used for simulating, or compensating for, how sound is received by a listener in a 3D space. For example, HRTFs are used in 3D audio rendering, such as in virtual surround sound for headphones.

BACKGROUND

HRTFs (Head Related Transfer Functions) describe the way in which a person hears sound in 3D, and can change depending on the position of the sound source. Typically, in order to calculate a received sound y(f, t), a signal x(f; t) transmitted by the sound source is combined with (e.g. multiplied by, or convolved with) the transfer function H(f).

HRTFs are individual to each person and depend on things like the size of their head and shape of their ear, with each ear having its own corresponding HRTF. HRTFs are typically broken down into three main features: interaural time difference (ITD) corresponding to the time delay between the left and right ears, interaural level difference (ILD) corresponding to the volume difference between the left and right ears, and spectral features such as pinnae notches causing frequency variations as sound waves reflect off a particularly shaped ear.

A user's HRTF profile can be adjusted to provide differing effects on the sound perceived by the user. For example, attempts have been made in the prior art to manually adjust elements of HRTF profiles to simulate effects such as a change in perceived sound source position. However, correctly adjusting the HRTF for a desired outcome can be challenging due to the many variations between the ear shapes of users, and there is often risk of distorting the sound and negatively impacting the overall audio experience for the user.

The disclosure herein provides improvements to the generation and/or manipulation of HRTFs to allow robust and controlled adjustment of the perceived location of a sound source without negatively impacting the sound delivered to the user.

SUMMARY OF INVENTION

According to a first aspect, the present disclosure provides an audio personalisation method for simulating perception of a vertical displacement of a sound source, the method comprising the steps of: obtaining an input head related transfer function, HRTF, associated with a user; determining an intended vertical displacement for the sound source; selecting at least one frequency region in the input HRTF; and adjusting the amplitude of the selected frequency region(s) to simulate the intended vertical displacement for the sound source.

Surprisingly, it has been found that adjusting the amplitude of specific frequency regions within an input HRTF can significantly affect the perceived vertical location of a sound source. The specific frequency region(s) adjusted will vary between different users, for example due to differences in head and/or ear shape, however unlike existing methods this does not require adjustments to be specifically personalised to each user. This reduces the processing required to simulate perception of the vertical displacement of a sound source and reduces the likelihood of distorting the simulated sound.

The term 'intended vertical displacement' may refer to, for example, an intended change in vertical position of the sound source (e.g., 1 m higher than existing sound source simulated location, or a 15 degree increase in elevation angle), or an intended target vertical position of the sound source (e.g., 1 m above a horizontal plane at a given distance, or a 15 degree elevation angle).

Optionally, the sound source has a lateral position, and the input HRTF comprises an input contralateral HRTF relating to a contralateral ear relative to the sound source, and the step of selecting at least one frequency region in the input HRTF comprises selecting at least one frequency region in the input contralateral HRTF.

The sound source having a lateral position refers to the sound source not being arranged the same distance from both ears of a user. That is, the sound source has a non-zero azimuth angle. It has been found that adjusting the amplitude of frequency region(s) of the HRTF of the contralateral ear to the sound source (i.e., the ear further from the sound source) in particular has a significant effect on the perceived virtual location of a sound source. This effect is achieved by adjusting the input contralateral HRTF independently of a corresponding input ipsilateral HRTF (i.e. the HRTF of the ipsilateral ear to the sound source).

Adjusting the input contralateral HRTF independently of the corresponding ipsilateral HRTF may mean that the magnitude of a frequency region of the ipsilateral HRTF is not adjusted. Alternatively, adjusting the input contralateral HRTF independently of the corresponding ipsilateral HRTF may mean that the magnitude of a frequency region of the input contralateral HRTF is adjusted disproportionately to a frequency region of the ipsilateral HRTF. For example, the magnitude of a frequency region of the input contralateral HRTF is adjusted more than the magnitude of a frequency region of the ipsilateral HRTF.

This is surprising as vertical localisation has previously been attributed to the FPN which is located in the ipsilateral HRTF, and so the techniques of the present disclosure enable vertical displacement of a sound source to be simulated without identifying or adjusting the FPN (or the ipsilateral HRTF) at all, thereby also reducing the likelihood of distorting a sound signal simulated from the sound source.

Furthermore, pinnae notches can cause significant reductions in the amplitude of specific frequencies of an HRTF. These frequencies also vary in the case of personalised HRTFs, making them more computationally demanding to manipulate. In contrast, the methods of the present invention can be generalised to all HRTFs and in general impose more gradual changes to the HRTF. The present methods can therefore produce a perceived change in elevation without such invasive spectral manipulations as FPN or pinna notch manipulation.

Optionally, the method comprises determining a contralateral ear based on the lateral position of the sound source. For example, when the lateral position of the sound source is closer to the right ear of a user than it is to the left ear of the user, this indicates the left ear of that user is the contralateral ear, and the HRTF corresponding to the left ear is the contralateral HRTF.

Optionally, the intended vertical displacement locates the sound source at a target vertical position, and wherein the step of adjusting the amplitude of the selected frequency region comprises the steps of: communicating, to the user, the target vertical position; incrementally adjusting the amplitude of the selected frequency region(s) until the sound source is simulated for the user at the target vertical position.

Users will have different HRTFs due to having different physical features (e.g., head size, ear shape and location, shoulders). The different HRTFs of different users means that the amplitude of the selected frequency region(s) may need to be adjusted differently in order to most accurately simulate the perception of a vertical displacement of a sound source for a particular user. Communicating the target vertical position to the user and incrementally adjusting the amplitude of the selected frequency region(s) in this manner means that the method more accurately adjusts the HRTF for a particular user according to the intended vertical displacement of the simulated sound source.

The audio personalisation method may start with a template adjusted HRTF corresponding to the target vertical position and adjust the amplitude of that template to create a more bespoke adjusted HRTF for a particular user. The template adjusted HRTF has already had the amplitude of a selected frequency adjusted in such a way that the simulated perception of a particular vertical displacement of a sound source would be roughly suitable for most users, and so less amplitude adjustment is necessary to fine-tune the HRTF for a particular user. Alternatively, the audio personalisation method may start with an unadjusted, horizontal HRTF (i.e., an HRTF corresponding to a sound source in the horizontal plane of the user) and adjust that horizontal HRTF to create the bespoke adjusted HRTF.

Optionally, the step of incrementally adjusting the amplitude of the selected frequency region(s) comprises a step of receiving user input, the user input comprising an indication of whether or not the user perceives the sound source to be located at the target vertical position.

In this way, the method is able to adjust the amplitude of the selected frequency region(s) and so too a current vertical displacement for the sound source using direct feedback from the user input, until the current vertical displacement for the sound source locates the sound source at the target vertical position. For example, the target vertical position may be elevated 45 degrees from horizontal from the users' point of view and the method involves receiving user input that indicates whether or not the user perceives the sound source to be located in a direction along the 45 degree elevation or not, and adjusting the amplitude of the input HRTF accordingly.

The user input may be feedback directly from the user such as the user manually indicating whether they perceive the vertical displacement of the sounds source to be above or below the target vertical position. The indication might also be automatic or inferred without requiring manual or even conscious input from the user. For example, the method may use head and/or eye tracking techniques to determine how the user reacts to the sound source in order to obtain an indication of whether or not the user perceives the sound source to be located at the target vertical position.

This process of receiving user input and incrementally adjusting the amplitude of the selected frequency region(s) may be performed as a method of calibrating an HRTF for a user before subsequently using the calibrated HRTF during audio playback. Alternatively, this may be an ongoing calibration process of receiving user input and adjusting the amplitude of the selected frequency region(s) during regular audio playback.

Preferably, the amplitude of the selected frequency region(s) is adjusted by 10 dB or less. That is, the amplitude of the selected frequency region(s) is increased or decreased by 10 dB or less. It has been found that adjusting the amplitude within this range produces the most accurately perceived elevation change without causing other undesired effects such as timbre changes.

Optionally, the step of adjusting the amplitude of the selected frequency region(s) comprises increasing the amplitude to simulate an increase in the vertical position of the sound source.

Optionally, the step of adjusting the amplitude of the selected frequency region(s) comprises decreasing the amplitude to simulate a decrease in the vertical position of the sound source.

Optionally, the adjustment in amplitude of the selected frequency region(s) is proportional to an adjustment of the simulated vertical position of the sound source.

Optionally, the step of selecting at least one frequency region comprises selecting a first frequency region and a second frequency region, and the step of adjusting the amplitude comprises adjusting the amplitude of the first frequency region by a first amount and adjusting the amplitude of the second frequency region by a second amount.

By adjusting the amplitude of different frequency regions by different amounts, the method is able to more accurately and precisely simulate perception of the vertical displacement of the sound source. This can be particularly useful when physical feature(s) of a user lead to a large number or varying spectral features.

Optionally, the step of adjusting the amplitude comprises one or more of: applying a single shelf filter, and applying multiple band pass filters.

Optionally, the at least one frequency region is selected within a frequency range of 4-20 kHz, and optionally within a frequency range of either 4-10 kHz or 12-20 kHz.

It has been found that adjusting the amplitude of the HRTF within these frequency ranges is particularly effective at simulating perception of the vertical displacement of a sound source. Even more so when these adjusted frequencies are frequency regions of the input contralateral HRTF, and the input ipsilateral HRTF is adjusted less than the input contralateral HRTF, or the input ipsilateral HRTF is not adjusted at all. The frequency region(s) selected may be identified or fine-tuned through analysis of a database of HRTFs. For example, this may include determining the average amplitudes of those database HRTFs at various frequencies, and the perceived vertical location associated with each of them.

Optionally, the input HRTF comprises an input ipsilateral HRTF, and the method further comprises selecting an ipsilateral frequency region and adjusting the amplitude of the selected ipsilateral frequency region to aid simulation of the intended vertical displacement for the sound source.

Optionally, the selected ipsilateral frequency region comprises a first pinna notch.

Though adjusting the amplitude of frequency region(s) of the input contralateral HRTF does simulate perception of vertical displacement of a sound source, this can be combined with adjusting the amplitude of ipsilateral frequency region(s) of an input ipsilateral HRTF to provide an input HRTF with a more realistic simulation of the vertical location of a sound source. For example, if the frequency of the first pinna notch is known then the amplitude of this frequency region can also be adjusted to aid the simulation of the intended vertical displacement for the sound source.

The expression aiding simulation refers to the simulated perception of a vertical displacement of a sound source being more realistic for a user. For example, the perceived vertical displacement of a sound source by a user is closer to the intended vertical displacement for the sound source.

Optionally, one or more of: the adjustment in amplitude of the selected frequency and the selection of one or more frequency regions, is based at least in part on a physical feature of the user.

The physical features of a user contribute to their personal HRTF, for example by creating spectral features such as pinnae notches. Therefore, basing the adjustment in amplitude on these physical features means the method can more accurately simulate perception of vertical displacement of a sound source for that particular user. Examples of physical features contributing to spectral features include the size, shape, and position of the user's head, ears, shoulders, torso, legs etc.

Optionally, the method further comprises the step of outputting a height compensated HRTF for the user, the height compensated HRTF comprising the adjusted amplitude(s) for the selected frequency region(s).

In this way, the height compensated HRTF can be used and/or saved for future use simulating perception of a vertical position of a sound source to a user. The height compensated HRTF can be used to simulate perception of a plurality of different sound signals originating from the sound source.

According to a second aspect, the present disclosure provides an audio personalisation method for simulating perception of a vertical position of a sound source to a user, comprising the steps of: for a contralateral head related transfer function, HRTF, associated with the user; selecting at least one frequency region in the contralateral HRTF; adjusting the amplitude of the selected frequency region(s) in dependence on a perceived vertical position of the sound source to obtain a height compensated contralateral HRTF; filtering a sound source signal using the compensated contralateral HRTF; outputting the filtered sound source signal for playback to the user.

In this way, the method adjusts the amplitude of at least one frequency region of a HRTF for the contralateral ear of a user, thereby obtaining a height compensated contralateral HRTF. Filtering a sound source signal using the height compensated HRTF and outputting this for playback to a user will simulate the sound source signal as originating from the perceived vertical position, such that the user perceives the sound source signal as originating from that position despite that this was not the case.

According to a third aspect, the present disclosure provides a system configured to perform a method according to the first aspect and/or a method according to the second aspect.

According to a fourth aspect, the present disclosure provides a system for audio personalisation, the system comprising: an obtaining unit configured to obtain an input head related transfer function, HRTF, associated with a user; a determining unit configured to determine an intended vertical displacement for a sound source; a selecting unit configured to select at least one frequency region in the input HRTF; and an adjusting unit configured to adjust the amplitude of the selected frequency region(s) to simulate the intended vertical displacement for the sound source.

According to a fifth aspect, the present disclosure provides a system for audio personalisation, the system comprising: a selecting unit configured to select at least one frequency region in a contralateral head related transfer function, HRTF, associated with a user; an adjusting unit configured to adjust the amplitude of the selected frequency region in dependence on a perceived vertical position of the sound source to obtain a height compensated contralateral HRTF; a filtering unit configured to filter a sound source signal using the compensated HRTF; and an output unit configured to output the filtered sound source signal for playback to the user.

It will be apparent that the units of the fourth and fifth aspects may be configured to perform multiple functions. For example, in the fourth aspect the obtaining unit may also be the determining unit and so be configured to both obtain the input HRTF and determine the intended vertical displacement.

In some examples of the third, fourth, or fifth aspects, the system may be an audio system or an audio-visual system such as a game console or virtual reality system.

According to a sixth aspect, there is provided a computer program comprising computer-readable instructions which, when executed by one or more processors, cause the one or more processors to perform a method according to the first aspect or according to the second aspect.

According to a seventh aspect, there is provided a non-transitory storage medium storing computer-readable instructions which, when executed by one or more processors, cause the one or more processors to perform a method according to the first aspect or according to the second aspect.

According to an eighth aspect, there is provided a signal comprising computer-readable instructions which, when executed by one or more processors, cause the one or more processors to perform a method according to the first aspect or according to the second aspect.

BRIEF DESCRIPTION OF DRAWINGS

Embodiments of the invention are described below, by way of example only, with reference to the accompanying drawings, in which.

DETAILED DESCRIPTION

Figure 1A:
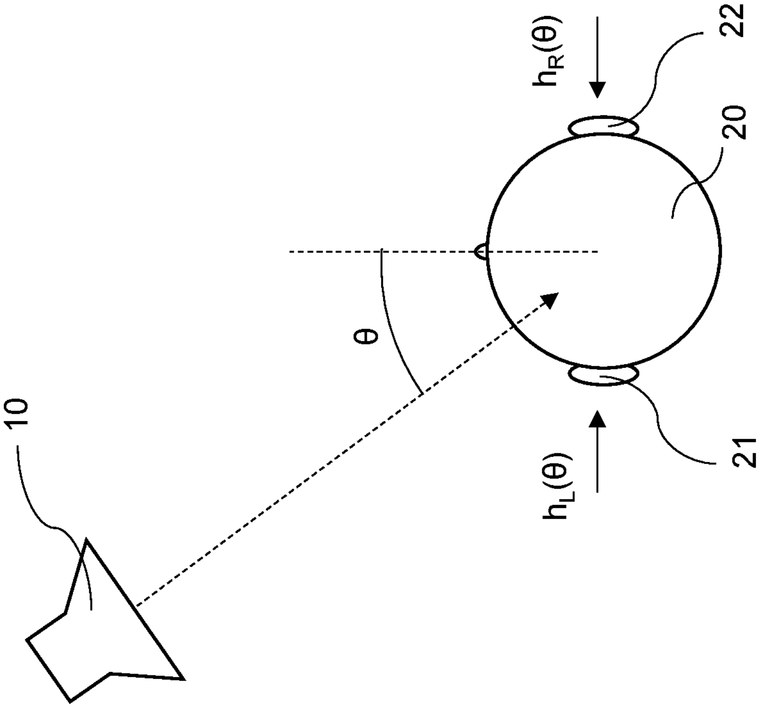
FIGS. 1A and 1B schematically illustrate HRTFs in the context of a real sound source offset from a user.

FIG. 1A schematically illustrates HRTFs in the context of a real sound source offset from a user.

As shown in FIG. 1A, the real sound source 10 is in front of and to the left of the user 20, at an azimuth angle θ in a horizontal plane relative to the user 20. The effect of positioning the sound source 10 at the angle θ can be modelled as a frequency-dependent filter $h_L(\theta)$ affecting the sound received by the user's left ear 21 and a frequency-dependent filter $h_R(\theta)$ affecting the sound received by the user's right ear 22. The combination of $h_L(\theta)$ and $h_R(\theta)$ is a head-related transfer function (HRTF) for azimuth angle θ. As the real sound source 10 is to the left of the user 20 and so closer to the user's left ear 21, the left ear 21 can also be referred to as the ipsilateral ear, and the right ear 22 the contralateral ear.

Figure 1B:
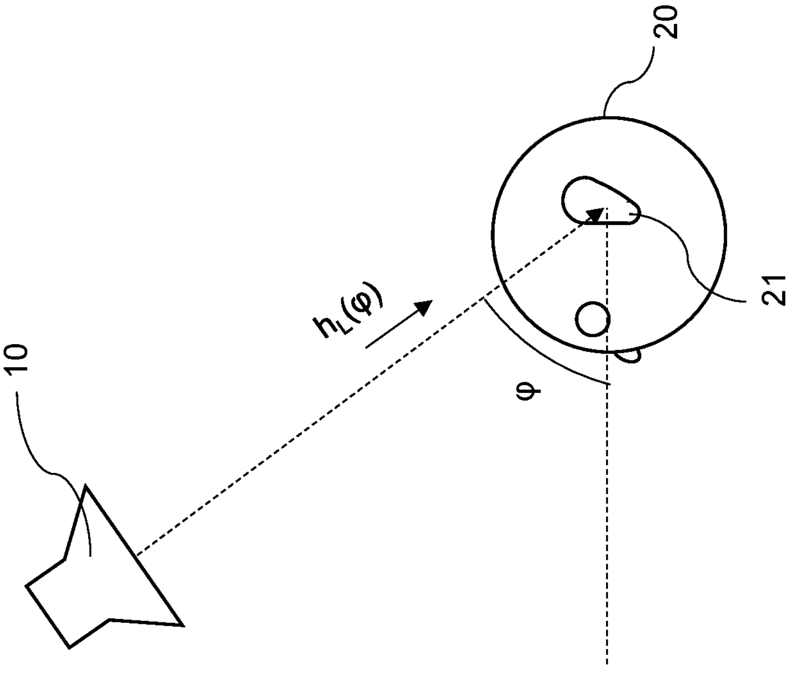

More generally, the position of the sound source 10 can be defined in three dimensions (e.g. ranger, azimuth angle θ and elevation angle (p), and the HRTF can be modelled as a function of three-dimensional position of the sound source 10 relative to the user 20. FIG. 1B shows the real sound source 10 from FIG. 1A from a second perspective, illustrating the real sound source 10 in front of the user 20 and raised above by an elevation angle cp.

Figure 2:
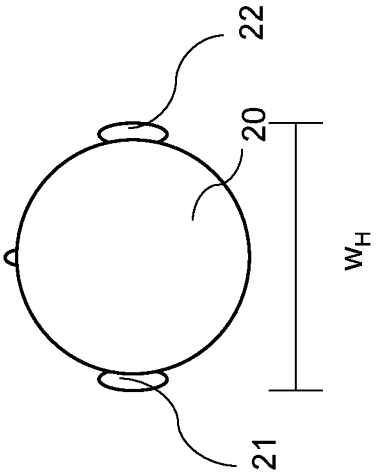
FIG. 2 illustrates head width as a hearing factor for generating an HRTF.
Figure 3:
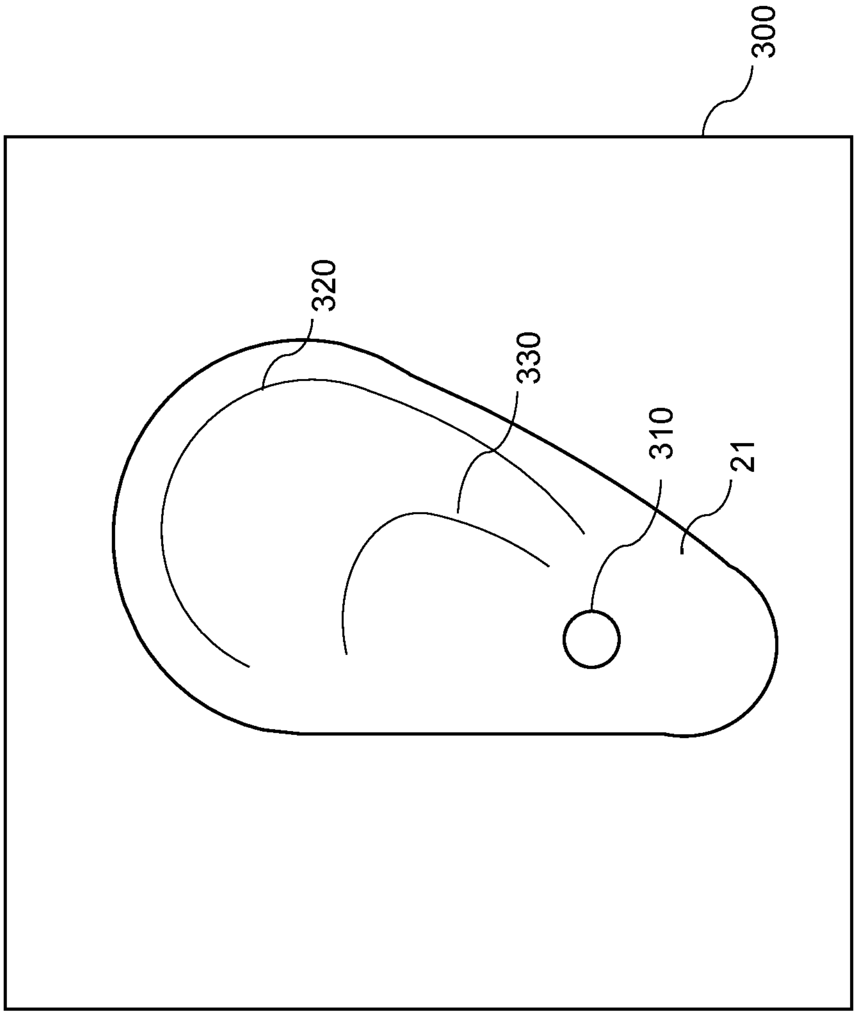
FIG. 3 illustrates obtaining pinna features as hearing factors for generating an HRTF.

As well as distance and direction, the sound received by each of the user's ears is affected by numerous hearing factors, including the following examples:

- The distance Wu between the user's ears 21, 22 (which is also called the "head width" herein) causes a delay between sound arriving at one ear and the same sound arriving at the other ear (an interaural time delay). This distance $w_H$ is illustrated in FIG. 2. Other head measurements can also be relevant to hearing and specifically relevant to interaural time delay, including head circumference, head depth and/or head height.
- Each of the user's ears has a different frequency-dependent sound sensitivity (i.e. the user's ears have an interaural level difference).
- The shape of the user's outer ear (pinna) creates one or more resonances or antiresonances, which appear in the HRTF as spectral peaks or notches. FIG. 3 illustrates pinna features 320, 330. In this example the pinna features are contours of the ear shape which affect how sound waves are directed to the auditory canal 310. The length and shape of the pinna feature affects which sound wavelengths are resonant or antiresonant with the pinna feature, and this response also typically depends on the position and direction of the sound source. Further spectral peaks or notches may be associated with other physical features of the user. For example, the user's shoulders and neck may affect how sound is reflected towards their ears. For at least some frequencies, more remote physical features of the user such as torso shape or leg shape may also be relevant.

Each of these factors may be dependent upon the position of the sound source. As a result, these factors are used in human perception of the position of a sound source.

When the sound source is distant from the user, the HRTF is generally only dependent on the direction of the sound source from the user. On the other hand, when the sound source is close to the user (e.g. in the case of headphones), the HRTF may be dependent upon both the direction of the sound source and the distance between the sound source and the user.

Figure 1C:
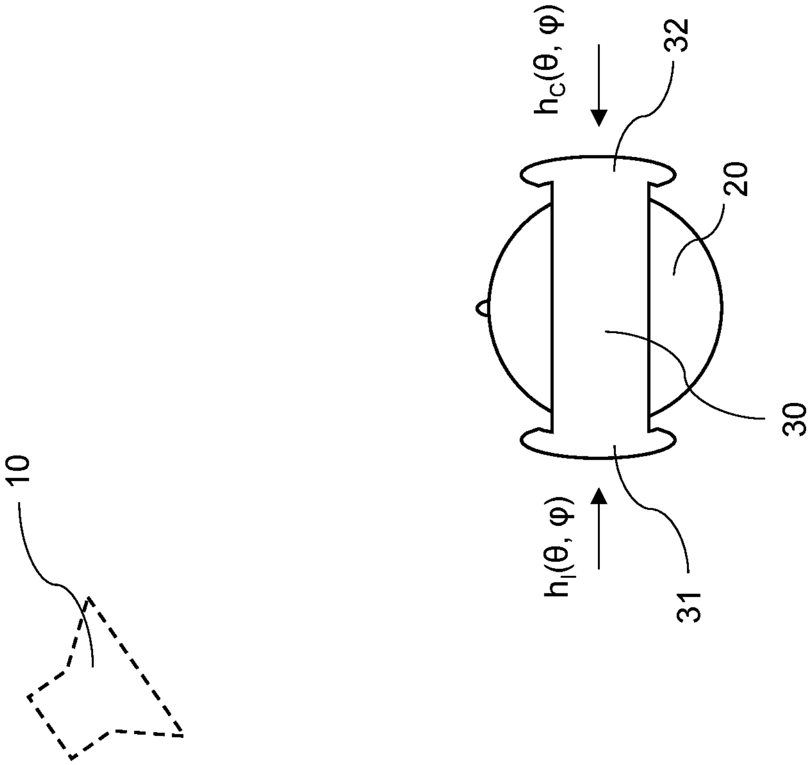
FIG. 1C schematically illustrates an equivalent virtual sound source offset from a user in audio provided by headphones.

FIG. 1C schematically illustrates an equivalent virtual sound source offset from a user in audio provided by headphones 30. Herein "headphones" generally includes any device with an on-ear or in-ear sound source for at least one ear, including VR headsets and ear buds.

In FIG. 1C, the virtual sound source 10 is simulated to be at an azimuth angle θ and an elevation angle φ relative to the user 20. In this example, the left side of is the ipsilateral side (e.g. of the user 20 or the headphones 30 worn by the user 20). The virtual sound source 10 is simulated by incorporating the HRTF for a sound source at azimuth angle θ and elevation angle φ as part of the sound signal emitted from the headphones 30. More specifically, the sound signal from the left speaker 31 of the headphones 30 incorporates $h_I(\theta, \varphi)$ and the sound signal from the right speaker 32 of the headphones incorporates $h_C(\theta, \varphi)$. Additionally, inverse filters $h^{-1}_{I0}$ and $h^{-1}_{c0}$ may be applied to the emitted signals to avoid perception of the "real" HRTF of the ipsilateral and right speakers 31, 32 at their positions LO and RO close to the ears.

Figure 4:
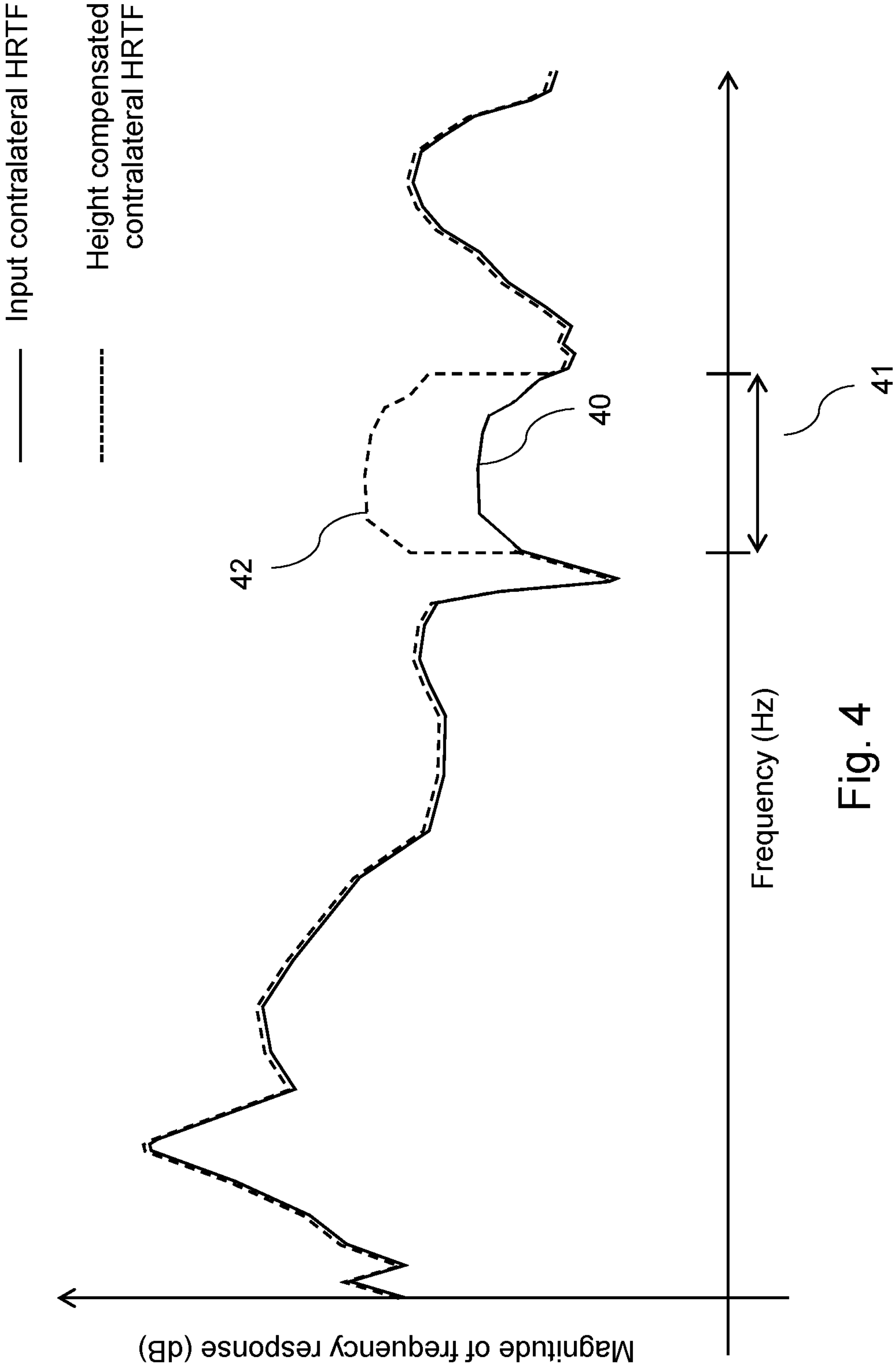
FIG. 4 illustrates an input HRTF and a height compensated HRTF adjusted according to the invention.

FIG. 4 shows a graph illustrating two HRTFs for an ear of a user, in particular showing the magnitude of the frequency response relative to the frequency of a sound source located at a particular azimuth and elevation angle. In this example, the HRTFs are of the contralateral ear of the user, with the solid line showing the input contralateral HRTF 40 and the dashed line showing the height compensated contralateral HRTF 42. As is apparent from the graph of FIG. 4, the amplitude of the response of the height compensated contralateral HRTF 42 has been adjusted (in this case boosted) within a selected frequency region 41. The height compensated contralateral HRTF 42 is shown as slightly offset from the input contralateral HRTF 40 in order to clearly show how the height compensated HRTF 42 matches the input HRTF outside of the selected frequency region 41, in practice the input HRTF 40 and height compensated HRTF 42 will overlay each other as closely as possible outside of the selected frequency region 41. In the example of FIG. 4, the amplitude of the height compensated contralateral HRTF 42 has only been adjusted at the selected frequency region 41, with the amplitude of each frequency within the selected frequency region 41 being adjusted by the same amount. In other examples, the areas near the edges of the selected frequency region 41 may also be adjusted by different amounts to smoothen the height compensated HRTF 42 and avoid creating a discontinuity in the HRTF 42 spectrum. These smoothed areas near the edges may be within the selected frequency region 41 and/or outside of the selected frequency region 41.

Continuing using the example of FIG. 1C, when this height compensated contralateral HRTF 42 is used in place of $h_C(\theta, \varphi)$ (which corresponded to the input contralateral HRTF 40) the user 20 will perceive the sound source 10 as being located at a higher elevation than they would have perceived a sound source 10 incorporating $h_C(\theta, \varphi)$. Similarly, if another height compensated contralateral HRTF had been adjusted by reducing the amplitude of the frequency response in the selected frequency region 41, the user 20 would perceive a sound source 10 as being located at a lower elevation than if $h_C(\theta, \varphi)$ had been used.

Figure 5A:
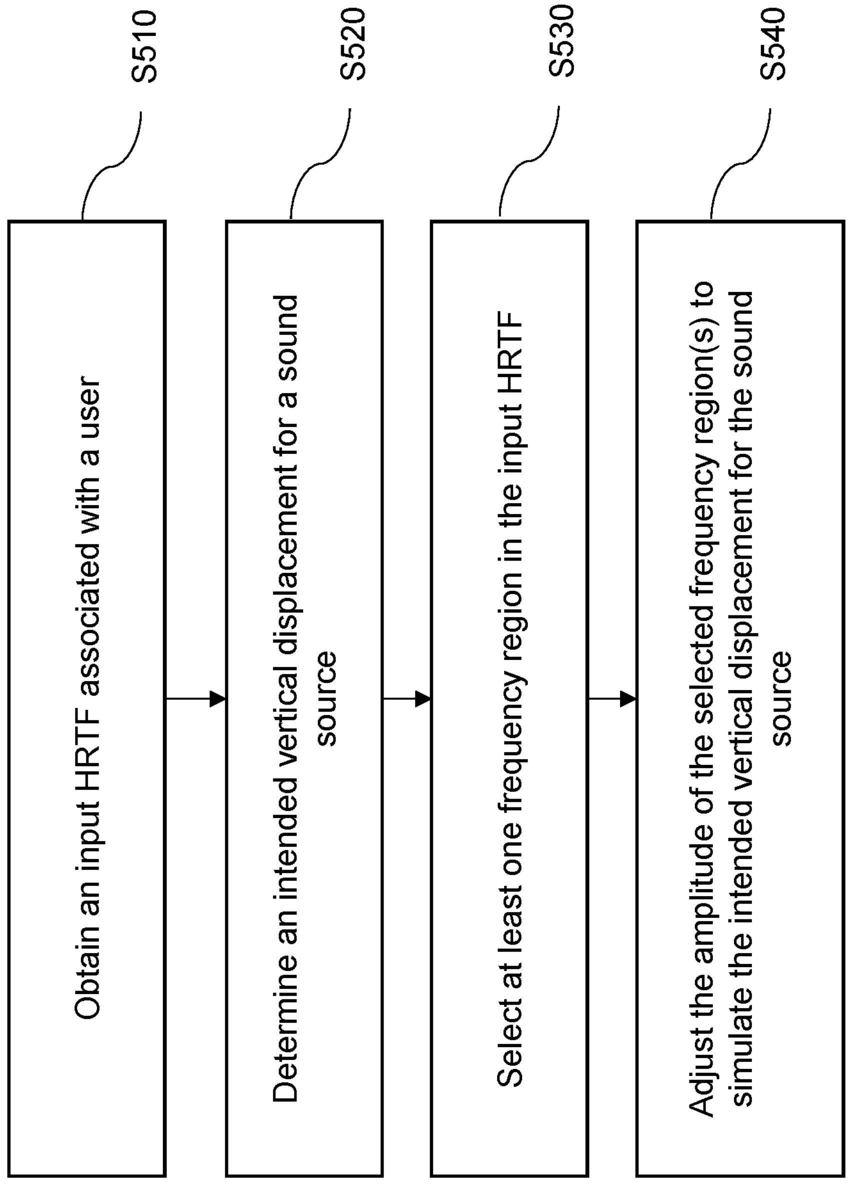
FIG. 5A illustrates an audio personalisation method for simulating perception of a vertical displacement of a sound source.

FIG. 5A schematically illustrates an audio personalisation method for simulating perception of a vertical displacement of a sound source. The method may be performed by any system, apparatus, or module capable of performing the method. For example the method may be performed by an HRTF generator implemented on a set of headphones 30, or in a base unit separate and/or independent from the headphones.

At step S510, an input HRTF associated with a user is obtained. The input HRTF is an HRTF corresponding to a particular sound source and may be a pre-set or template HRTF configured to be suitable for a plurality of users or, alternatively, may be a personalized HRTF for the user. The input HRTF may be received from a device or system separate to that performing the audio personalisation method, or may be generated and obtained by the device performing the audio personalisation method.

At step S520, an intended vertical displacement for the sound source is determined. The intended vertical displacement may refer the intended target vertical position of the sound source or the intended change in the vertical position relative to the sound source location of the input HRTF. For example, if the input HRTF corresponded to a sound source at an elevation angle of 5 degrees, and the intention for the method is to simulate perception of a sound source at an elevation angle of 10 degrees, then the intended vertical displacement will be 10 degrees if it is the intended vertical position of the sound source, or 5 degrees if it is the intended change in the vertical position.

At step S530, at least one frequency region in the input HRTF is selected and, at step S540 the amplitude of the selected frequency region(s) is adjusted to simulate the intended vertical displacement for the sound source.

As discussed above, it has traditionally been thought that the location of the first pinna notch (FPN) in the ipsilateral HRTF is related to the perceived elevation of a sound source. However, adjusting the amplitude of an input HRTF in discrete frequency regions can also simulate perception of vertical displacement of a sound source without the risks associated with incorrectly adjusting the FPN of the ipsilateral HRTF (e.g., distorting the timbre of a sound signal).

In an example where the sound source has a lateral position and is not arranged the same distance from both ears, it is preferred to adjust the contralateral HRTF of the input HRTF (either in isolation from or combination with the ipsilateral HRTF). In such cases, the step of selecting at least one frequency region in the input HRTF comprises selecting at least on frequency region in the input contralateral HRTF. If the input contralateral HRTF is not known then the method will also include determining a contralateral ear (of the user) based on the lateral position of the sound source. As the input contralateral HRTF relates to the contralateral ear relative to the sound source, this enables identification and/or obtaining of the input contralateral HRTF.

Adjustments to selected frequency region(s) can be applied in a variety of ways, for example using a single shelf filter, or more intricately by using multiple band pass filters for well-defined adjusted frequency region(s). The appropriate frequency region to adjust can be selected based on analysis of the user's physical features, the input HRTF, database analysis, or any other applicable method. For example, using database analysis of HRTFs it has been found that adjusting the amplitude of frequencies in the range of 4 kHz to 20 kHz, and in particular the 4-10 kHz and 12-20 kHz regions, effectively causes a perceive change in elevation of a sound source. This simulated perceived elevation change is most effective when the adjusted input HRTF comprises the input contralateral HRTF.

The amplitude of different selected frequency regions can be adjusted by different amounts, for example using multiple band pass filters. These different selected frequency regions can be on the same HRTF (e.g., multiple selected frequency regions on the input contralateral HRTF) or may be regions of different HRTFs (e.g., a first selected frequency region(s) on the input contralateral HRTF and a second selected frequency region(s) on the input ipsilateral HRTF). In some examples of the invention, frequency region(s) of an input ipsilateral HRTF are also selected for adjustment. These selected ipsilateral region(s) can be adjusted in the same manner described above in order to aid simulation of the intended vertical displacement for the sound source. As the FPN is generally and most prominently located in the ipsilateral HRTF and is associated with vertical localisation, the frequencies of the FPN may be selected as a selected ipsilateral region for amplitude adjustment.

Figure 5B:
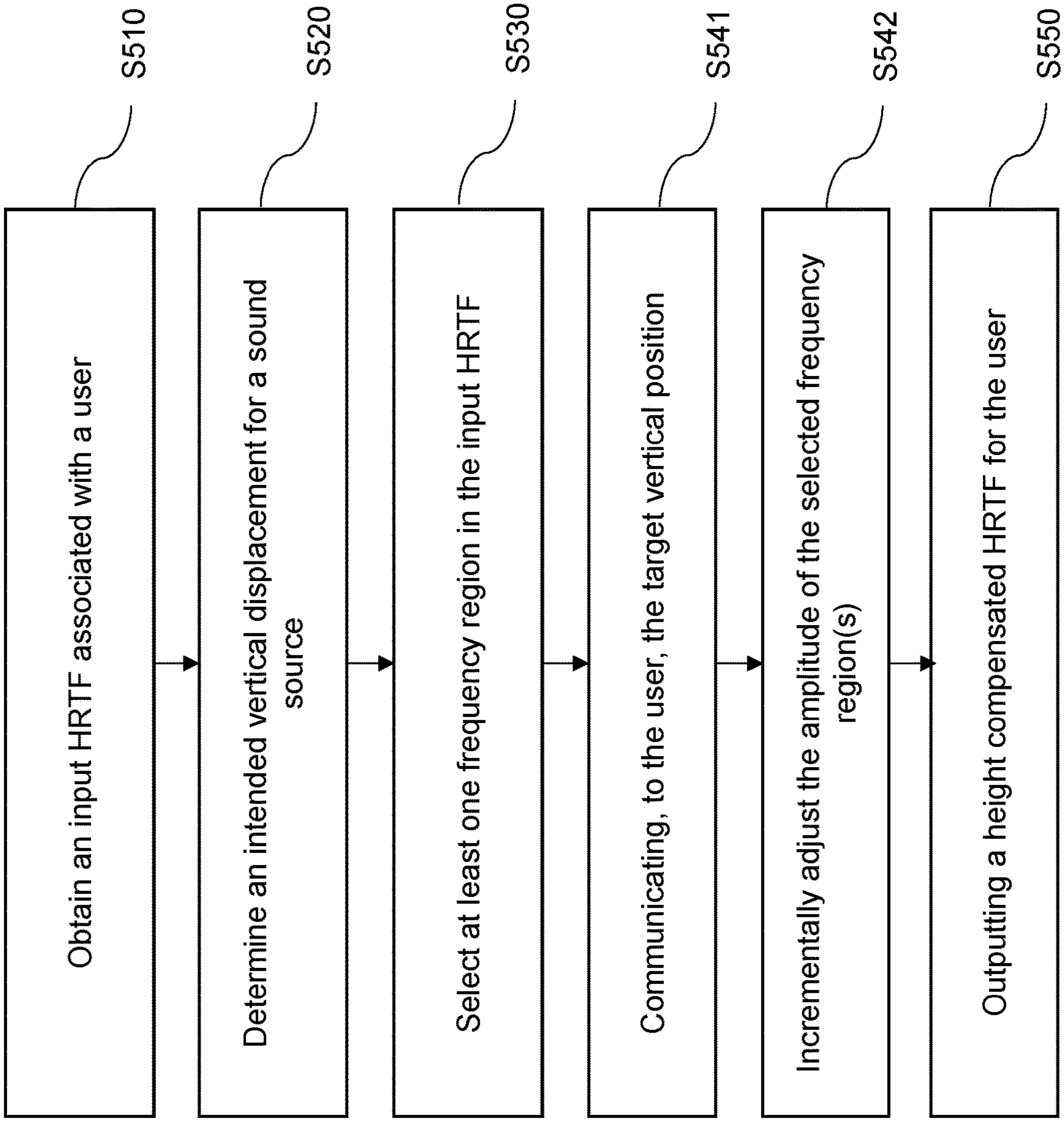
FIG. 5B illustrates an expanded audio personalisation method for simulating perception of a vertical displacement of a sound source.

FIG. 5B shows an example of an expanded audio personalisation method for simulating perception of a vertical displacement of a sound source. Steps S510, S520 and S530 in FIG. 5B are the same as those discussed above in relation to FIG. 5A. In this expanded method, the intended vertical displacement locates the sound source at a target vertical position and, in step S541 as part of step S540 adjusting the amplitude of the selected frequency region(s), this target vertical position is communicated to the user. The target vertical position may be communicated to the user multiple times throughout the incremental adjustment process, helping to ensure the user stays accurately aware of the target vertical position.

In step S542 the amplitude of the selected frequency region(s) is incrementally adjusted until the sound source is simulated for the user at the target vertical position. This incremental adjustment can include receiving user input comprising an indication of whether the user perceives the sound source to be located at the target vertical position. The user feedback may be active input or may be passive input where the user is not aware they are providing user input indicating their perception of the sound source location. For example, the method may be used in combination with a virtual-reality headset including headphones and an eye-tracking mechanism. In this example, the headphones can playback a sound source filtered using the adjusted HRTF and use the eye-tracking mechanism to determine where the user looks in response to the filtered sound source. If the user looks below the target vertical position then this is user input indicating the user perceives the sound source to be located below the target vertical position, and so the amplitude of the selected frequency region(s) may be boosted to simulate an increase in the vertical position of the sound.

In step S550, a height compensated HRTF for the user is output. The height compensated HRTF comprises the adjusted amplitude(s) for the selected frequency region(s) and so can be used to simulate perception of various different sound signals originating from the sound source. This height compensated HRTF can also be saved, for example in a memory or database, for later retrieval when other sound signals are simulated from the same virtual location.

Figure 6:
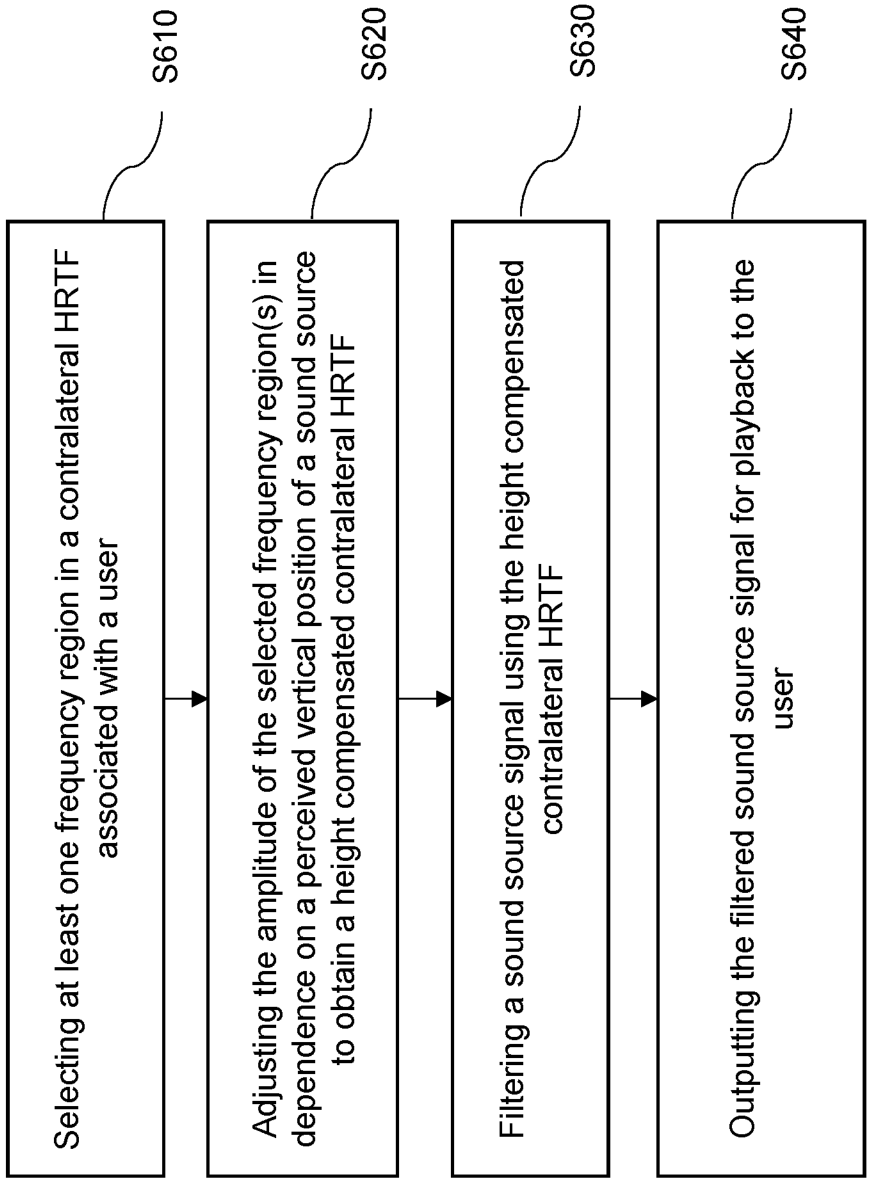
FIG. 6 illustrates another audio personalisation method for simulating perception of a vertical displacement of a sound source.

FIG. 6 shows another audio personalisation method for simulating perception of a vertical displacement of a sound source. It will be appreciated that the details described above in relation to the previous methods are also applicable to the method of FIG. 6 and so these will not be repeated in full.

At step S610, at least one frequency region in a contralateral HRTF associated with a user is selected. The frequency region(s) may be selected using any of the techniques discussed above in relation to step S530.

At step S620, the amplitude of the selected frequency region(s) is adjusted in dependence on a perceived vertical position of a sound source to obtain a height compensated contralateral HRTF. Step S620 may include the techniques discussed above in relation to steps S520, S540, S541, S542, and S550.

As well as selecting and adjust the amplitude of frequency region(s) of the contralateral HRTF, the method can also include adjusting the amplitude of frequency region(s) of a corresponding ipsilateral HRTF associated with same the user and the sound source.

Once the height compensated contralateral HRTF has been obtained, it is used in step S630 to filter a sound source signal to provide a filtered sound source signal. The sound source signal comprises an audio signal and so the filtered sound source signal comprises a filtered audio signal. This filtering may be performed at a playback device such as headphones, or remotely from the playback device such as by an interactive audio-visual system or a cloud processing service. Before step S630 is performed, if the sound source signal is played to the user then they will not perceive the sound source of the audio signal as being located at the perceived vertical position, except by chance. After step S630 has been performed then when the filtered sound source signal is played to the user they will perceive the sound source of the audio signal as being located at the perceived vertical position.

At step S640, the filtered sound source signal is output for playback to the user. As the sound source signal has been filtered using the height compensated contralateral HRTF, it will simulate the sound source of the signal as being at the perceived vertical position used as part of step S620 when adjusting the amplitude of the selected frequency region(s). As with step S630, step S640 may be performed at playback device or remote from the playback device, with the filtered sound source signal being output to a playback device for playback to the user.

The above methods may be performed by an HRTF generator or any system suitable for audio personalisation. The HRTF generator may be implemented in a set of headphones, in a base unit configured to communicate with the headphones, or may be independent from the headphones. In one example, the HRTF generator could be implemented in an interactive audio-visual system such as a game console which is associated with the headphones. In another example, the HRTF generator may be implemented in a server or cloud service. The HRTF generator may be implemented using a general-purpose memory and processor together with appropriate software. Alternatively, the HRTF generator may comprise hardware, such as an ASIC, which is specifically adapted to perform the methods.

Having described aspects of the disclosure in detail, it will be apparent that modifications and variations are possible without departing from the scope of aspects of the disclosure as defined in the appended claims. As various changes could be made in the above methods and products without departing from the scope of aspects of the disclosure, it is intended that all matter contained in the above description and shown in the accompanying drawings shall be interpreted as illustrative and not in a limiting sense.

The invention claimed is:

1. An audio personalisation method for simulating perception of a vertical displacement of a sound source, the method comprising:
- obtaining an input head related transfer function (HRTF) associated with a user;
- determining an intended vertical displacement for the sound source;
- selecting one or more frequency sub-regions in the input HRTF based at least in part on one or more physical features of the user; and
- adjusting an amplitude of the selected one or more frequency sub-regions in the input HRTF to simulate the intended vertical displacement for the sound source.

2. The audio personalisation method of claim 1, wherein the one or more physical features comprise a head, ears, shoulders, torso, legs, or a combination thereof.

3. The audio personalisation method of claim 1, wherein selecting the one or more frequency sub-regions in the input HRTF comprises:
- selecting the frequency region based on a size, shape, position, or a combination thereof of the one or more physical features.

4. The audio personalisation method of claim 1, wherein selecting the one or more frequency sub-regions in the input HRTF comprises:
- selecting a first frequency sub-region and a second frequency sub-region in the input HRTF based at least in part on one or more physical features of the user.

5. The audio personalisation method of claim 4, wherein adjusting the amplitude comprises:
- determining, for the first frequency sub-region and the second frequency sub-region, respective amplitude adjustments; and
- applying the respective amplitude adjustments to the first frequency sub-region and the second frequency sub-region.

6. The audio personalisation method of claim 5, the respective amplitude adjustments are different.

7. The audio personalisation method of claim 5, wherein determining, for the first frequency sub-region and the second frequency sub-region, respective amplitude adjustments comprises:
- determining the amplitude adjustment for the second frequency sub-region based on the amplitude adjustment for the first frequency sub-region.

8. The audio personalisation method of claim 5, wherein the input HRTF comprises an input contralateral HRTF associated with a contralateral ear relative to the sound source and an input ipsilateral HRTF associated with an ipsilateral ear relative to the sound source.

9. The audio personalisation method of claim 8, wherein selecting the one or more frequency sub-regions in the input HRTF comprises:
- selecting at least one frequency sub-region in the input contralateral HRTF; and
- selecting at least one frequency sub-region in the input ipsilateral HRTF.

10. The audio personalisation method of claim 9, wherein adjusting the amplitude comprises:
- adjusting the amplitude of the least one frequency sub-region in the input contralateral HRTF and adjusting the amplitude of the least one frequency sub-region in the input ipsilateral HRTF independently.

11. The audio personalisation method of claim 8, further comprising:
- determining a lateral position of the sound source; and
- determining a contralateral ear and an ipsilateral ear based on the lateral position of the sound source.

12. The audio personalisation method of claim 1, wherein adjusting the amplitude of the selected frequency region comprises:
- receiving user feedback data that characterizes an accuracy of the HRTF; and
- adjusting the amplitude of the one or more selected frequency sub-regions based on the user feedback data.

13. The audio personalisation method of claim 12, adjusting the amplitude of the one or more selected frequency sub-regions comprises:

incrementally adjusting the amplitude of the one or more selected frequency sub-regions based on the user feedback data.

14. The audio personalisation method of claim 1, wherein adjusting the amplitude comprises:

determining an increase in amplitude based on an increase in a vertical position of the sound source.

15. The audio personalisation method of claim 1, wherein adjusting the amplitude comprises:

determining a decrease in amplitude based on a decrease in a vertical position of the sound source.

16. The audio personalisation method according to claim 1, wherein adjusting the amplitude comprises:

applying a shelf filter to the selected one or more frequency sub-regions.

17. The audio personalisation method according to claim 1, wherein adjusting the amplitude comprises:

applying a plurality of band pass filters to the selected one or more frequency sub-regions.

18. The audio personalisation method of claim 1, wherein adjusting the amplitude comprises:

determining an adjustment based at least in part on the one or more physical features of the user.

19. A system comprising one or more computers and one or more storage devices on which are stored instructions that are operable, when executed by the one or more computers, to cause the one or more computers to perform operations comprising:

obtaining an input head related transfer function (HRTF) associated with a user;

determining an intended vertical displacement for the sound source;

selecting one or more frequency sub-regions in the input HRTF based at least in part on one or more physical features of the user; and adjusting an amplitude of the selected one or more frequency sub-regions in the input HRTF to simulate the intended vertical displacement for the sound source.

20. A non-transitory computer readable storage medium storing one or more computer programs configured to cause a processor-based system to execute operations comprising:

obtaining an input head related transfer function (HRTF) associated with a user;

determining an intended vertical displacement for the sound source;

selecting one or more frequency sub-regions in the input HRTF based at least in part on one or more physical features of the user; and adjusting an amplitude of the selected one or more frequency sub-regions in the input HRTF to simulate the intended vertical displacement for the sound source.

* * * * *